United States Patent [19]
Markovic

[11] Patent Number: 6,017,046
[45] Date of Patent: Jan. 25, 2000

[54] WHEELCHAIR APPARATUS

[76] Inventor: Vladimir Markovic, Taksima 125, Ljubljana, Slovenia, 1021

[21] Appl. No.: 09/009,921

[22] Filed: Jan. 21, 1998

[51] Int. Cl.[7] .............................. B62M 1/14; F16H 29/12
[52] U.S. Cl. ..................... 280/250.1; 74/143; 74/810.1; 74/473.28; 192/215; 464/38; 280/244
[58] Field of Search .................................. 74/143, 810.1, 74/473.28; 192/21.5; 280/244, 250.1; 464/38

[56] References Cited

U.S. PATENT DOCUMENTS

| | | | |
|---|---|---|---|
| 3,563,568 | 2/1971 | Sasse | 280/230 |
| 4,471,972 | 9/1984 | Young | 280/289 WC |
| 4,560,181 | 12/1985 | Herron | 280/250.1 |
| 4,583,754 | 4/1986 | Seeliger | 280/246 |
| 4,758,013 | 7/1988 | Agrillo | 280/242 WC |
| 4,993,732 | 2/1991 | Wedemeyer | 280/250.1 |
| 5,167,168 | 12/1992 | Beumer | 280/250.1 X |
| 5,263,729 | 11/1993 | Watwood et al. | 280/250.1 X |

FOREIGN PATENT DOCUMENTS

| | | |
|---|---|---|
| 0463651 | 1/1992 | European Pat. Off. . |
| 3932538 | 3/1990 | Germany . |
| PCT/SI94/00016 | 3/1995 | WIPO . |

*Primary Examiner*—Allan D. Herrmann
*Attorney, Agent, or Firm*—Factor and Shaftal

[57] ABSTRACT

The invention comprises a drive system for use in association with a wheelchair. The drive system includes at least one input gear system, a structure for powering at least one input gear system, at least one transfer gear system, a positioning member, and a structure for transferring movement of the transfer gear system to a wheel. The positioning member positions the desired one of at least two sets of gears of the at least one transfer gear with at least one of the two sets of gears of the at least one input gear system through slidable movement of the at least one of the transfer gear system and the input gear system along their respective axes of rotation. This, in turn, engages the desired gear of the transfer gear system to the desired gear of the input gear system during continuous rotation of these gears. Additionally, the invention includes a handle member for use with a linear conversion system. Further, the invention includes a structure for preventing seizure of a linear conversion system in the event of an improper direction selection.

16 Claims, 9 Drawing Sheets

WHEELCHAIR APPARATUS

BACKGROUND OF THE INVENTION

1. Field of the Invention

The invention relates in general to a wheelchair, and in particular, to a human powered wheelchair utilizing both a forward and a rearward linear motion to convert linear movement to into rotative movement of the wheels, wherein the hub of the wheel is capable of controlled rotation in the event of inappropriate gearing selection, and where the user can comfortably utilize the wheelchair for an extended period of time.

2. Background Art

Wheelchairs have long been known in the art. Generally, it is most desirable to convert the maximum possible energy of the user to the movement of the wheelchair in the desired direction. Specifically, with the least amount of effort, the user should be able to control various parameters of the wheelchair movement to enable controlled travel for extended periods of time. While many wheelchair improvements have been attempted, most of these include deficiencies which render them little more effective than a conventional wheelchair. Further, many of these wheelchairs that have been created are limited by complex designs that are neither efficient nor easily used and/or maintained.

The manual wheelchairs can be divided into four general categories. The first category includes wheelchairs which are powered by hand to impart forces to an outer rim proximate the outer tire of the wheelchair. These chairs have certain benefits inasmuch as they are relatively easy to maneuver. For instance, the wheelchair can be rotated in place by rotating one wheel in a first direction and rotating the second wheel in a second direction. However, these wheelchairs do suffer from certain drawbacks. For instance, the user, after imparting energy from the hands to the wheel, must move the hand back to its original position so that the working stroke can be repeated. Thus, for half of the movement of the wheel the user's hands are not even touching the rim, much less transferring any energy to the wheel. Further, due to the position of the user relative to the wheel, it is difficult to impart energy efficiently to the wheel. In fact, only a portion of the user's strength is available for transfer to the wheel, and only through a small angle of rotation of the wheel. Moreover, the user's positioning is rather uncomfortable throughout the working stroke to the wrists, hands, arms, shoulders, and throughout the body. This may cause further injury in certain situations, especially after prolonged use.

The second type of wheelchair comprises the use of a highly positioned handle which is associated with eccentrically fastened crank that converts linear movement of the handle into rotative movement of the drive wheel. Such wheelchairs date to the early 1900's. One such example can be seen in U.S. Pat. No. 4,993,732. Such a wheelchair can exhibit positive results on flat terrain. However, these wheelchairs exhibit certain drawbacks with respect to maneuvering, as well as travel on inclined surfaces. Moreover, the repetitive powering by a user is quite tiring on the muscles.

Specifically, due to human physiology, these wheelchairs are less than ideal. In fact, while they may be well suited for a user that has full use of the lower body, to most users confined in a wheelchair, this is not the case. Where the user does not have control of the lower body extremities, these wheelchairs are difficult to operate, inasmuch as the user cannot use his or her lower body to counteract the undesirable forces that are created by the upper body. Moreover, the use of this type of wheelchair focuses on only a small group of the user's muscles.

The third group of wheelchairs comprises the "pedal principle" driven wheelchairs. Such a wheelchair can be seen in U.S. Pat. Nos. 4,758,013 and 4,471,972. Specifically, the user through a pedal-like system converts rotative movement of the hands, through a series of belts or chains to rotative movement of the front wheels. While these types of wheelchairs may accept gear changers, and, in turn, several gears, due to the relatively bulky construction, conventional wheelchair structures (two small wheels in the front and two large wheels in the rear) are difficult to operate. Further, even with specialized constructions, inherently poor and uncomfortable positioning of the user's hands results in difficulties with respect to maneuvering the wheelchair. Moreover, the inherent dead-spots in the cyclical movement of the "pedals" makes travel on inclined surfaces quite difficult.

The final group of wheelchairs comprises other solutions which serve to convert linear movement of the user's hands into rotative movement of the wheels of the wheelchair. While these other solutions serve to convert more of the user's energy to movement of the wheelchair than the prior three types, many of these chairs are incapable of safely transporting the users. Indeed, some of these chairs are so hazardous that more harm than good can be achieved. One such example is SI P 94 00 241, which has effectively sought to transfer energy, but has not fully addressed safety concerns and adaptability to users that are incapable of operating both of their hands. For example, this solution, as well as the others, do not adequate solve the following important design criteria:

- facilitating the changing of gears during movement. Current devices rely on stopping or on chains with derailleurs. Thus, often when a gear change is most desirable, it is not possible;
- facilitating safety systems which prevent abrupt changes in the wheelchair operation should the user inadvertently engage the forward gears while traveling in reverse (or visa versa). In fact, changing from forward to reverse during forward movement would seize the gearing and catapult the user of a mechanism such as that described in SI P 94 00 241; and
- effective handles for facilitating proper transfer of energy and minimizing discomfort to the user to facilitate extensive and continuous use. The heretofore positioning and orientation of handles used in association with such wheelchairs have limited the forces that actually were transferred to the wheelchair, have resulted in hand, arm and shoulder injuries after repetitive and continuous use, and have adversely fatigued the user.

SUMMARY OF THE INVENTION

The invention comprises a drive system for use in association with a wheelchair. The drive system includes at least one input gear system, means for powering at least one input gear system, at least one transfer gear system, a positioning member, and means for transferring movement of the transfer gear system to a wheel. The at least one input gear system is positioned on a first axis of rotation. The at least one input gear system includes at least two sets of gears. Each of these gears have teeth defining peaks and valleys, one of at least one peak of each of the at least two sets of gears corresponding to each other, or at least one valley of each of the at least two sets of gears corresponding to each other. The at least one transfer gear system is positioned on a second axis of rotation and is selectively engageable with the at least one input gear system. The at least one transfer gear system includes at least two sets of gears, each of the gears have teeth defining peaks and valleys, the opposite, relative to the input gear system, of the at least one peak or the at least one valley of the at least two sets of gears of the at least one transfer gear system corresponding to each other. The positioning member positions the desired one of at least two sets of gears of the at least one transfer gear with at least one of the two sets of gears of the at least one input gear system through slidable movement of the at least one of the transfer gear system and the input gear system along their respective axes of rotation to, in turn, engage the desired gear of the transfer gear system to the desired gear of the input gear system during rotation of these gears.

In a preferred embodiment, the drive system comprises of a single input gear system having two sets of gears, wherein each of the gears has a different diameter. In another preferred embodiment, the at least one transfer gear system comprises two transfer gear systems. Each of the transfer gear systems includes two sets of gears and rotating on distinct axis of rotation.

In another preferred embodiment, the powering means comprises a handle member rotatably associated with the at least one input gear system. The selective positioning means includes a gear selector lever associated with the input gear system in the handle member.

In another preferred embodiment, the drive system may further include means for braking the wheel and means for selecting the direction of rotation of the wheel. Both the directional selection means and the braking means are associated with the handgrip region of the handle member. This in turn facilitates control without releasing the user's hands from the grip region. In such a preferred embodiment, the braking means includes at least one brake shoe associated with the hub region of the wheel, a lever which is preferably associated with the handgrip region and a cable member associated with at least one brake shoe and the lever. Movement of the lever facilitates selective engagement of the brake shoe in the hub region of the wheel.

In such a preferred embodiment, the movement transferring means may include at least one hub gear associated with the transfer gear system and slidably engageable with a forward final drive gear. The direction selection means, in such an embodiment, comprises an engagement member associated with an extension region of the handle member. The engagement member is pivotally associated with a mount region of the handle member. Pivoting of the engagement member relative to the mount member slidably positions the gear hub in the desired engagement with either the forward or rearward final drive gear.

In such a preferred embodiment, the drive system may further include means for retaining the desired selected direction of rotation of the wheel. In such a preferred embodiment, the handle member further includes a mount region and an extension region. The extension region is associated with the direction selection means and pivotally or slidably associated with the mount region. The retaining means further comprises at least one rack member associated with one of the mount region and the extension region and at least one pawl member associated with the other of the mount region and the extension region. The at least one pawl member engages at least one rack member upon relative movement of the mount region relative to the extension region to retain the extension region and, in turn, the direction selecting means in the appropriate desired position.

The invention further comprises a wheelchair drive system for use in association with a wheelchair having a frame and at least two wheels. The drive system comprises a handle member rotatably associated with the hub region of the wheel, a linear conversion system, means for selecting a desired direction of rotation, and means for precluding seizure of the hub region. The handle member further includes a hand grip region for accepting at least a portion of at least one of a user's hand and arm. The linear conversion system is associated with the hub region of the wheel and is capable of continuously transferring clockwise and counter-clockwise rotation of the handle member into rotation of the wheels in a selected direction of rotation. The seizure precluding means precludes seizure of the hub region of the wheel upon selection of an inappropriate direction of rotation of the wheel.

In a preferred embodiment, the seizure precluding means further includes means for controllably stopping the rotation of the wheel. In another preferred embodiment, the linear conversion system includes at least one input gear on a first axis for rotation, at least one forward drive gear associated with a second axis of rotation and the wheel hub, and a rearward drive gear associated with a third axis of rotation and the wheel hub. The seizure preclusion means includes a first clutch and a second clutch. The first clutch is biased against a forward drive gear and rotatably associated with a third axis of rotation. The second clutch is biased against the rearward drive gear and rotatably associated with the second axis of rotation. The first and second clutches are capable of independently disengaging from the forward drive gear and the rearward drive gear respectively upon selection of an inappropriate direction rotation of the wheel.

The invention further comprises a handle member for use in association of the drive system of a wheelchair. In such a wheelchair, the drive system of the wheelchair includes a linear conversion system located in the hub of a wheel having an outer rim circumference. Wherein the wheel mounts approximate to the axis of the back of the wheelchair. The handle member comprises of a first leg and a second leg. The first leg extends from the drive system outwardly toward the wheel circumference. The second leg extends from the first leg. At least a portion of the second leg extends at least proximate the outer rim of the circumference of the wheel. The second leg is angled relative to the first leg at an angle between 90° and 150°.

In a preferred embodiment, the outer rim circumference of the wheel is between 20 inches and 26 inches. In another preferred embodiment, the angle between the first and second leg is between 90° and 110°.

DETAILED DESCRIPTION OF THE DRAWINGS

While this invention is susceptible of embodiment in many different forms, there is shown in the drawings and will herein be described in detail, specific embodiments with the understanding that the present disclosure can be considered as an exemplification of the principles of the invention and is not intended to limit the invention to the embodiment illustrated.

Drive system 20 is shown in FIGS. 1–5,8–9 as comprising wheel 28, handle member 22, linear conversion system 24 and means 26 for precluding seizure of the linear conversion system. Drive system 20 is mountable on any type of device for which linear power is to be converted to rotative power, such as a wheelchair.

While not required, most preferably, drive system 20 is positioned within wheel and is directly linked to the wheel. Of course, it is also contemplated that drive system may be positioned outside and away from the wheel region where it may be linked to the wheel through any one of gears, belts or chains. It is however realized that generally such a positioning may increase frictional losses and may increase overall size and bulkiness of the system.

It is likewise contemplated that in a wheelchair apparatus, the drive system may be mounted on one or both sides of the wheelchair. Additionally, it is contemplated that the particular wheelchair may be custom fitted for accepting the drive system, or, the drive system may be configured as a retrofit unit to replace conventional, or other drive systems of wheelchairs. When mounted within the wheel of a wheelchair, it is preferable, although certainly not required, that the center of the wheel be positioned proximate axis 153 (FIG. 9) of the back rest of the wheelchair; for instance, within 10 inches of the axis of the back rest of the wheelchair.

Figure 9:
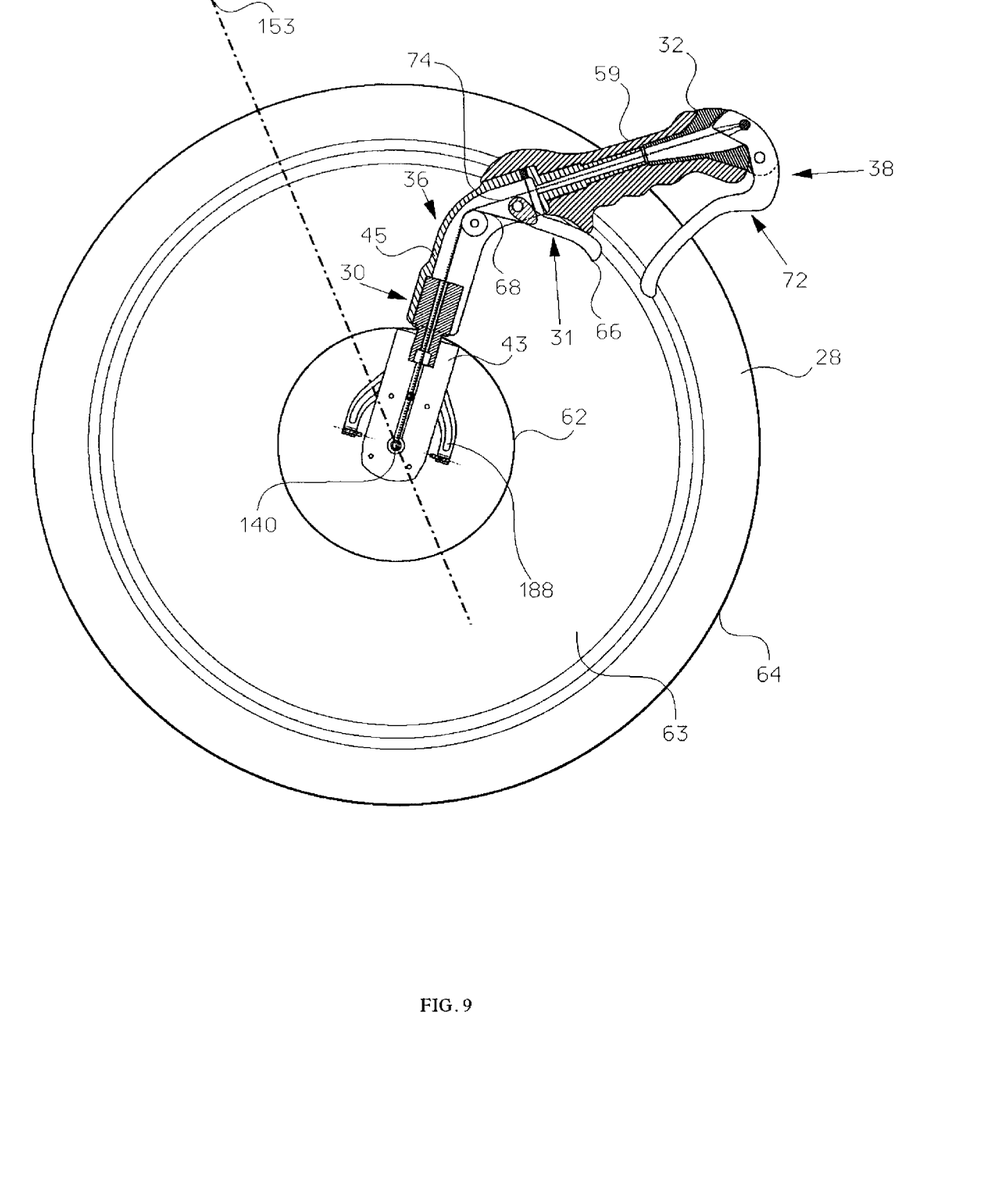
FIG. 9 of the drawings is a partial cross-sectional view of the drive system showing in particular the construction of the handle member.

Wheel 28, as shown in FIG. 9 includes hub region 62, rim 63 and tire 64. Hub region 62 extends around the outer side of the rim which includes the linear conversion system therewithin. While other configurations are contemplated, hub region extends around the entirety of the linear conversion system so as to prevent the entry of debris or foreign bodies into the linear conversion system. This will extend the life of the drive system, as well as serve to prevent injury thereto. As explained, the wheel and the linear conversion system may be separate and distinct structures linked through belts, chains or pulleys.

Handle member 22 is shown in FIGS. 1–4 and 8–9 as comprising first leg region 30, second leg region 32, gear shift member 34, direction member 36 and brake member 38. First leg region 30 extends from hub region 62 in a generally straight line to the outer circumference of the wheel (FIG. 9). First leg region includes mount region 43 rotatably fixed to first axis of rotation 140, and an extension region 45 pivotally associated with an outward end of the mount region 43. Of course, while it is contemplated that first leg region 30 extends through the center of hub region 62, it is also contemplated that first leg region 30 extends proximate the center, but not directly therethrough.

Second leg region 32, as shown in FIG. 9, extends at an angle of 90° to 150° relative to the first leg region, and most preferably between 90° and 110°. The second leg region includes mount region 43 and extension region 45 which is pivotally associated with mount region 43. The second leg region extends to approximately tire 64, and includes a grip region. Of course, other configurations are contemplated, however, it has been found through substantial experimentation that this particular orientation of the first and the second leg regions is exceptionally suited for handle members that extend from hub region 62 to tire 64, especially where the hub 62 is positioned proximate the axis of the back rest of the wheelchair. This configuration essentially facilitates extended use while minimizing fatigue.

Gear shift member 34 is shown in FIGS. 1–5 and 8–9 as comprising lever member 66 and cable 68. Lever member 66 can be positioned on either one of first leg region 30 and second leg region 32, proximate the grip region, and is pivotable through a distance ∂. Cable 68 extends from lever member 66 to input gear system 40 of linear conversion system 24 (as will be explained hereinbelow).

Direction member 36 is shown in FIGS. 1–5, 8 as comprising means 70 for maintaining the proper gear. Proper gear maintaining means 70 comprises spring 104, pawl 106 and rack 108. Rack 108 is fixed to mount region 43 whereas pawl 106, and, in turn, spring 104 are associated with extension region 45 of handle member 22. As will be explained outward or inward movement of extension region 45 of second leg 32 (such as for example movement of the extension region while the user is gripping grip region) relative to the mount region 43 about axis 185 will adjust pawl 106 into one of the racked positions. The selected position is, in turn, maintained by biasing spring 186.

Likewise, as will be explained, the outward and inward movement serves to engage the desired forward or rearward final drive gear 50, 54, respectively through slidable movement of selector 188 (see also FIG. 9). Of course other engagement systems, such as those that rely on axial movement of the second leg 32 relative to mount member, and in turn, hub region 62 (instead of pivotal movement of same) are likewise contemplated.

Figure 8:
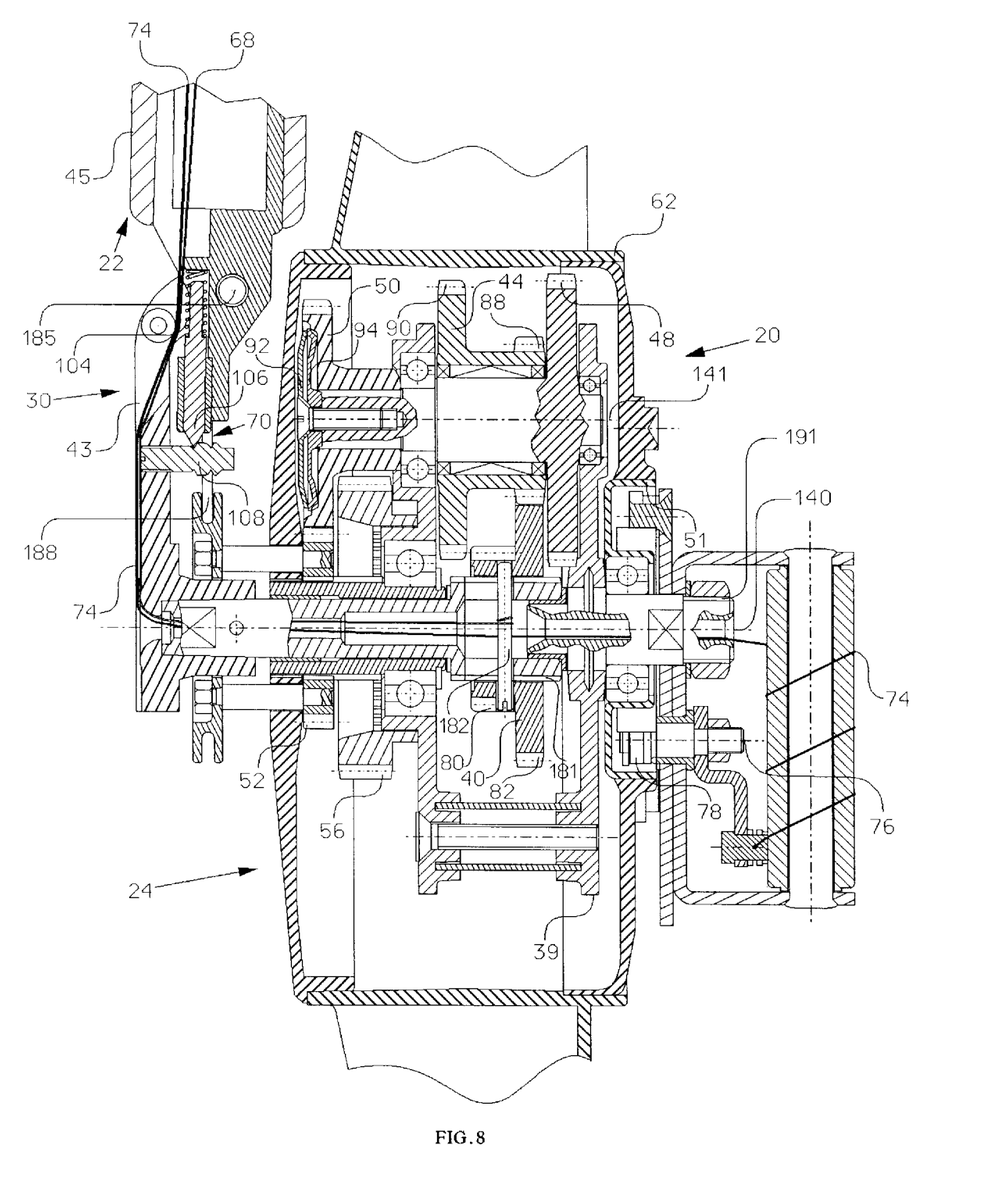
FIG. 8 of the drawings is a partial cross-sectional view of the drive system of the present invention showing in particular the brake.

Brake member 38 is shown in FIGS. 8 and 9 as comprising brake lever 72, cable 74, separator 76 and shoes 78. Brake lever 72 is pivotally associated with first leg 30 of handle member 22, much like a bicycle lever. Cable 74 extends within first leg member and through first axle 140 to separator 76 which is positioned on the inner side of mount 144 of linear conversion system 24. As will be explained as the brake member is pivoted relative to the handle member, the separator forces shoes 78 to frictionally engage drum region 51 of hub 62, to in turn, stop or retard the rotation of the hub, and in turn, the wheel.

Linear conversion system 24 is shown in FIGS. 1–5 and 8 as comprising mount chassis 39, input gear system 40, first single direction drive gear system 42, second single direction drive gear system 44, first rear drive gear 46, second rear drive gear 48, forward final drive gear 50, forward hub gear 52, rearward final drive gear 54, rear hub gear 56 and first, second and third axles of rotation 140, 139 and 141, respectively. All three axis of rotation are positioned between mounting chassis 39 and are maintained by chassis 39 in the proper orientation. As will be explained, the linear conversion system converts linear movement of the handle member into rotative movement of the output shaft, and in turn, the hub and wheel.

As shown in FIGS. 1–5, 8, input gear system 40 is rotatably fixed to mount region 43 of second leg 32, so that rotation of the handle member rotates input gear system 40 about first axis of rotation 140 and axle 191. Input gear system 40 includes a set of gears, namely, smaller gear 80 and larger gear 82 which is attached to axle 181 by way of pin 182 to facilitate unitary rotation of thereof. Smaller gear 80 includes peaks such as peak 110 and valleys such as valley 112. Larger gear 82 includes peaks such as peak 114 and valleys such as valley 116. Of course, while two gears are shown in input gear system 40, additional gears, for example, for a racing wheelchair, are likewise contemplated for use.

Figure 1:
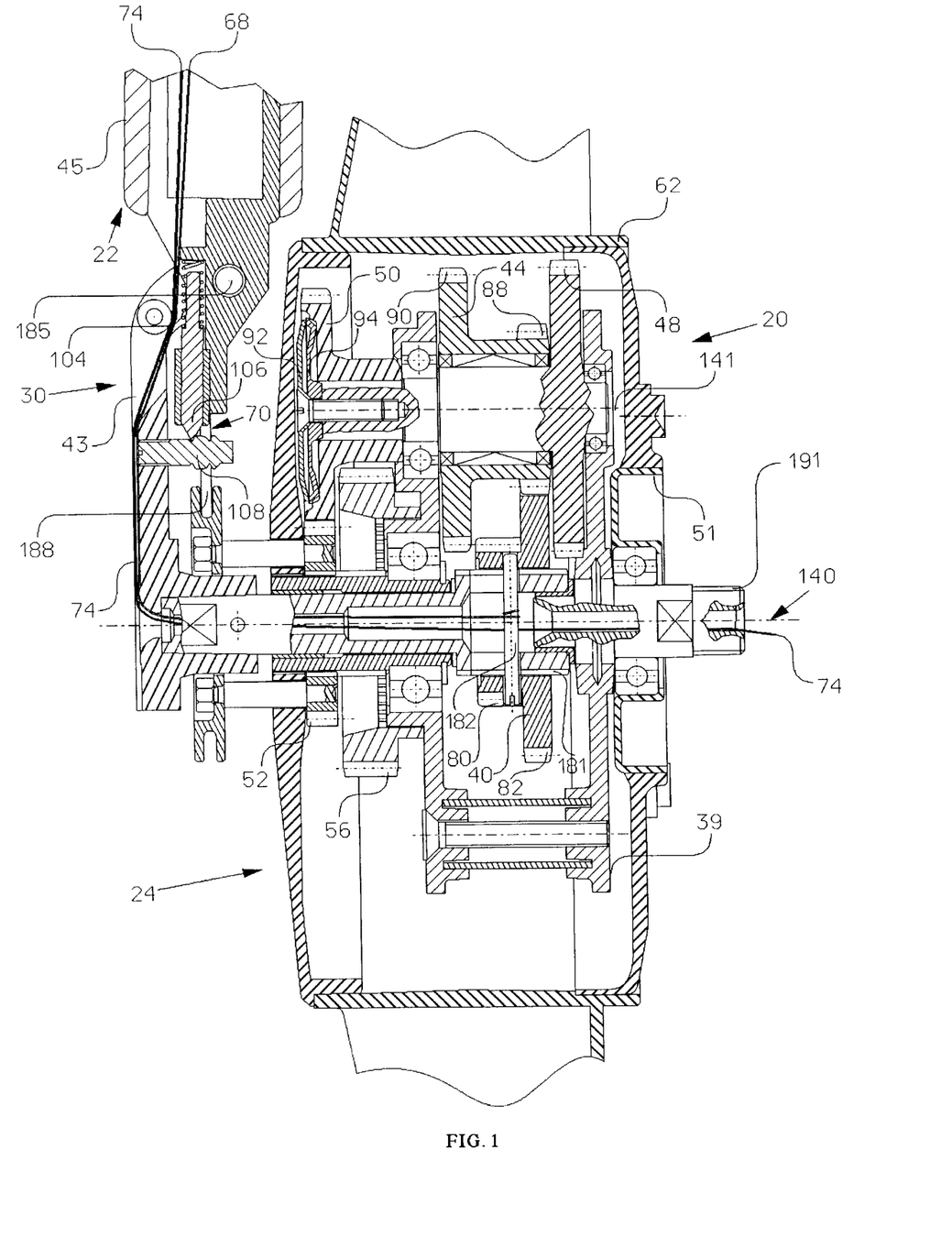
FIG. 1 of the drawings is a partial cross-sectional view of the drive system of the present invention, showing in particular engagement of the forward gears, and in high gear.
Figure 2:
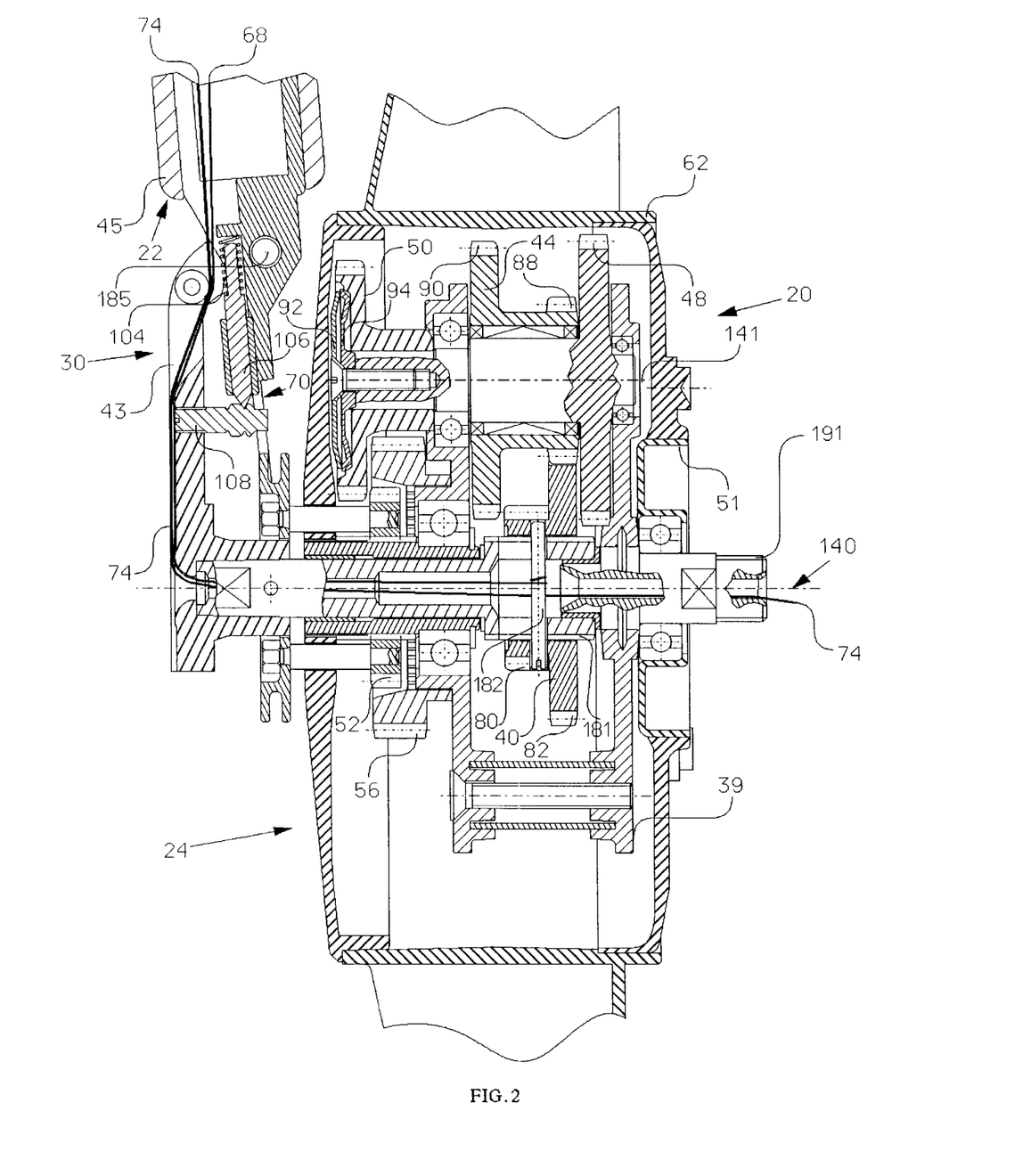
FIG. 2 of the drawings is a partial cross-sectional view of the drive system of the present invention showing in particular engagement in neutral, and in high gear.
Figure 3:
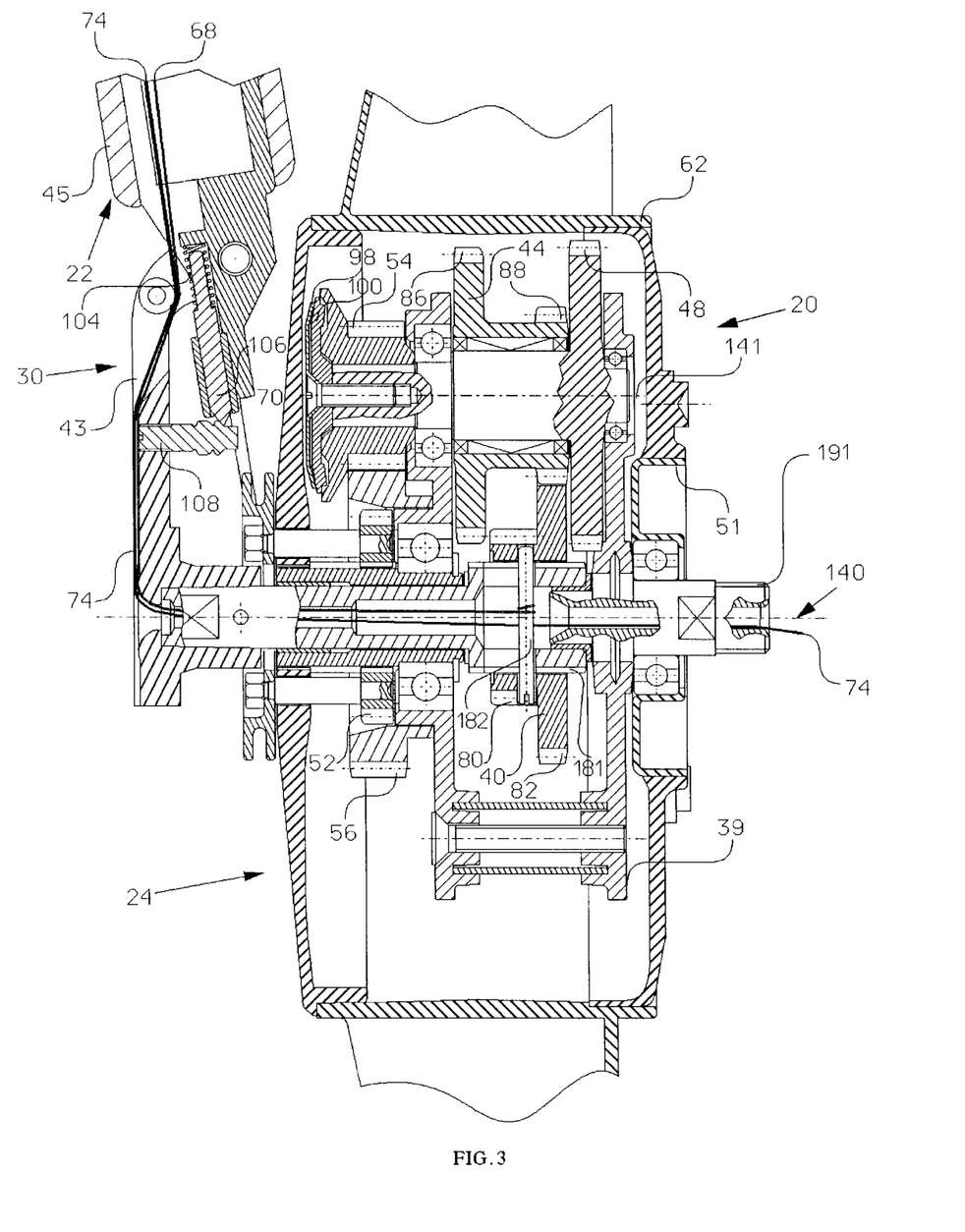
FIG. 3 of the drawings is a partial cross-sectional view of the drive system of the present invention, showing in particular engagement of the rearward gears, and in high gear.
Figure 4:
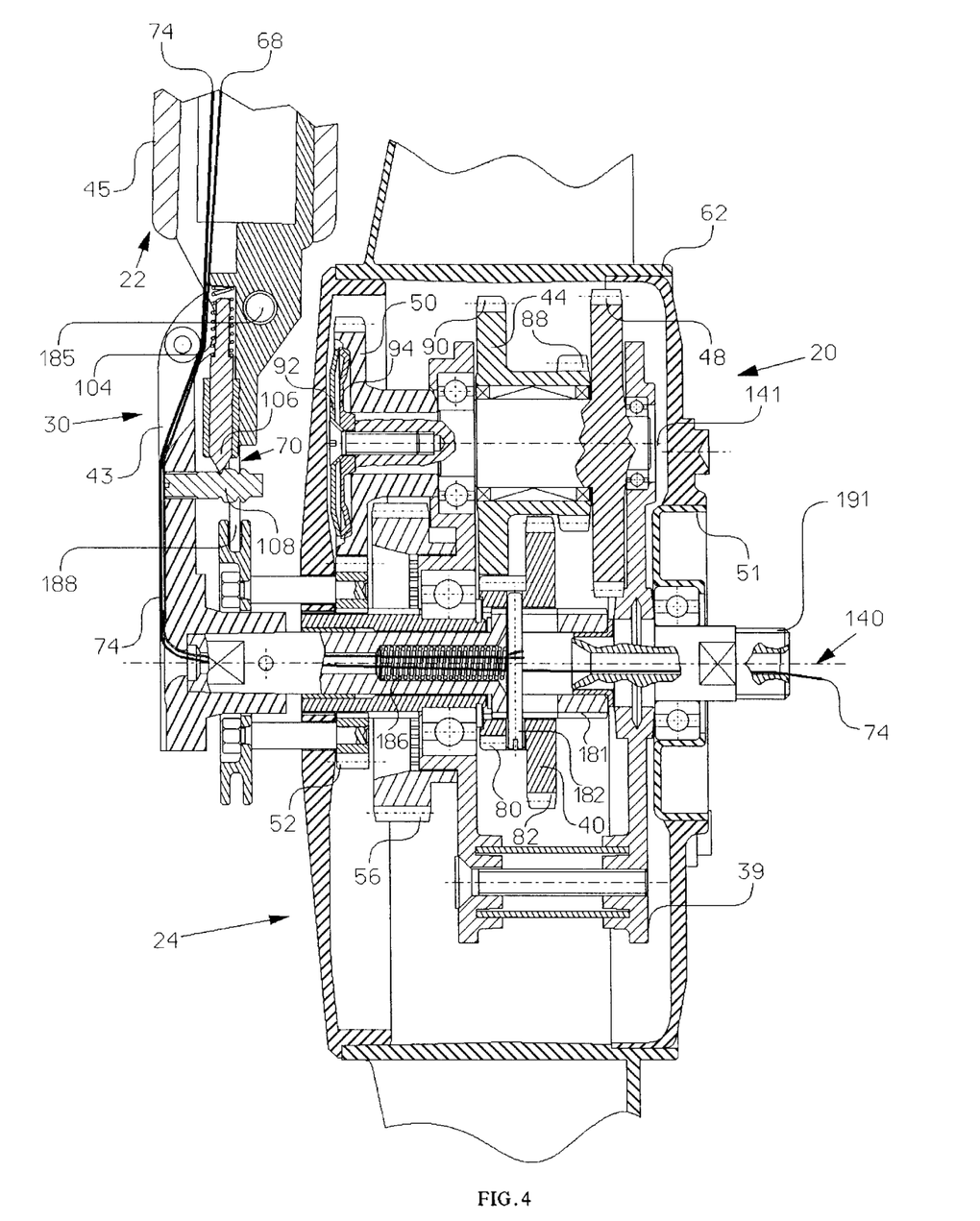
FIG. 4 of the drawings is a partial cross-sectional view of the drive system of the present invention, showing in particular engagement of the forward gears, and in a low gear.
Figure 5:
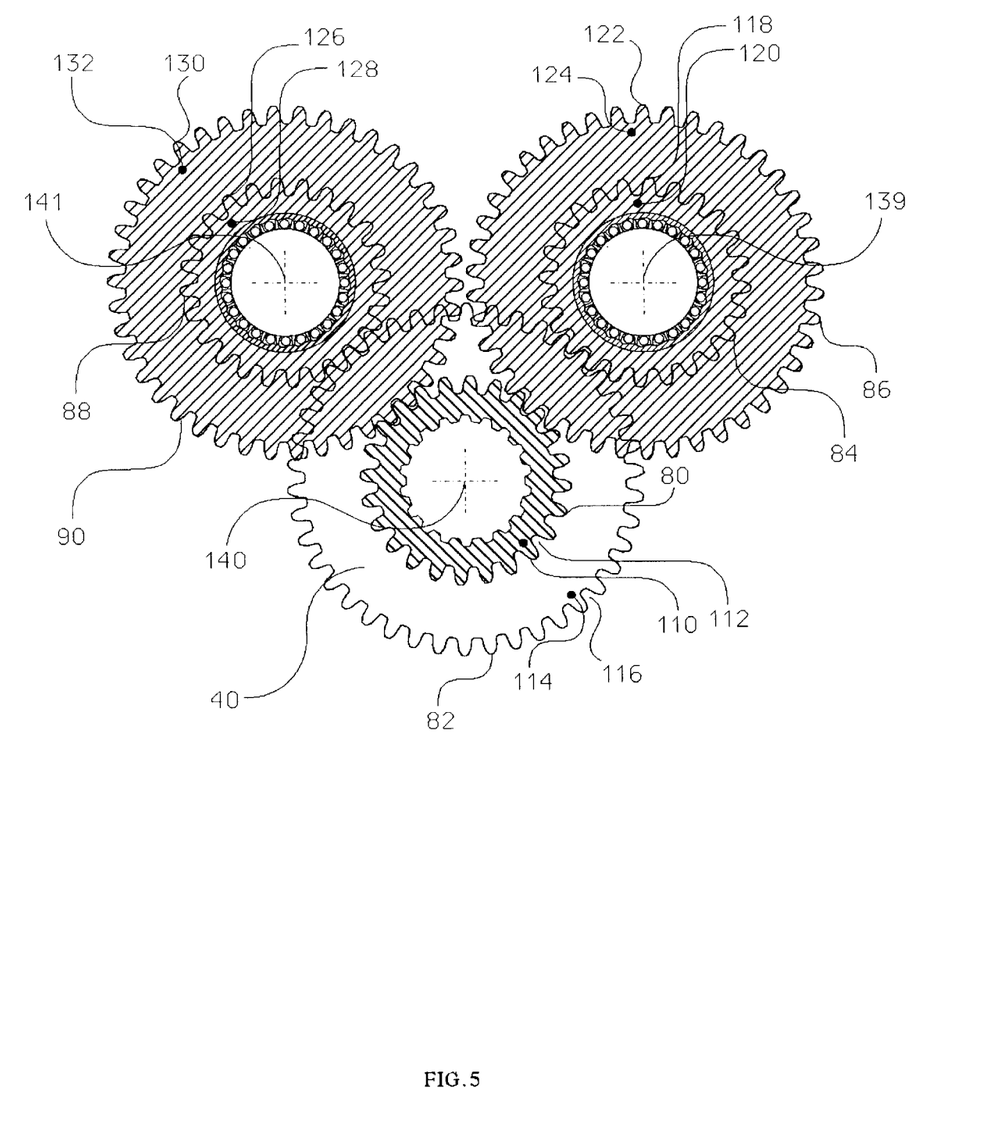
FIG. 5 of the drawings is a front elevational view of the input gear system and the first and second single direction gears.
Figure 6A:
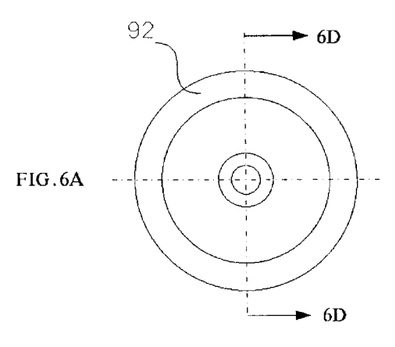
FIG. 6A of the drawings is a top plan view of the spring plate of the forward clutch member of the present invention.
Figure 6B:
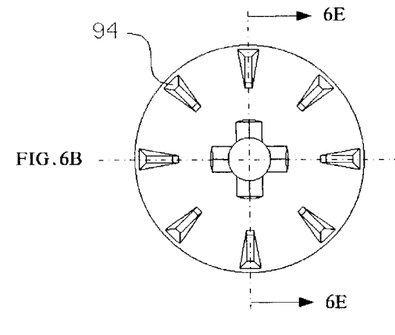
FIG. 6B of the drawings is a top plan view of the clutch plate of the forward clutch member of the present invention.
Figure 6C:
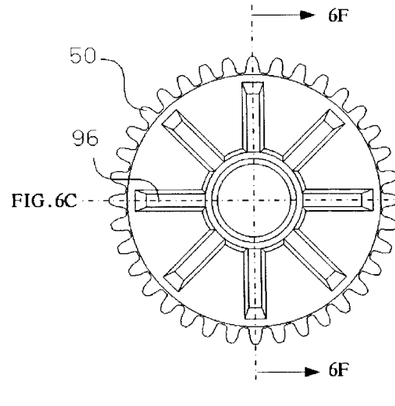
FIG. 6C of the drawings is a top plan view of the final drive gear of the forward clutch member which includes the mating form.
Figure 6D:
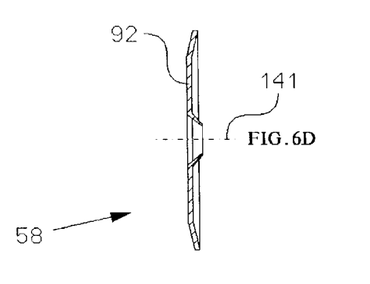
FIG. 6D of the drawings is a cross-sectional view of the spring plate of FIG. 6A taken generally about lines 6D—6D of FIG. 6A.
Figure 6E:
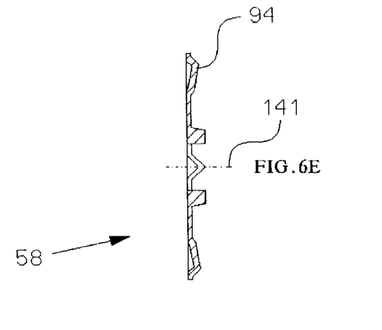
FIG. 6E of the drawings is a cross-sectional view of the clutch plate of FIG. 6B taken generally about lines 6E—6E of FIG. 6B.
Figure 6F:
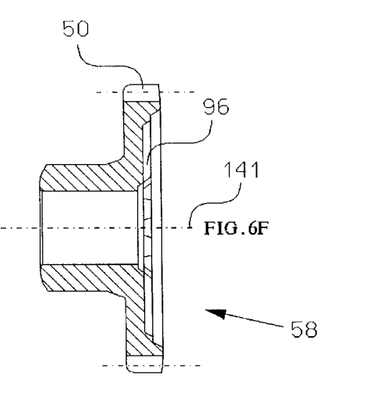
FIG. 6F of the drawings is a cross-sectional view of the final drive gear having the mating form shown in FIG. 6C taken generally about lines 6F—6F of FIG. 6C.
Figure 7A:
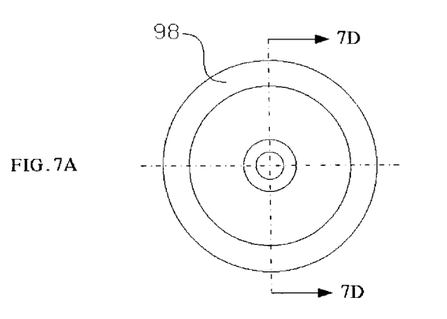
FIG. 7A of the drawings is a top plan view of the spring plate of the rearward clutch member of the present invention.
Figure 7B:
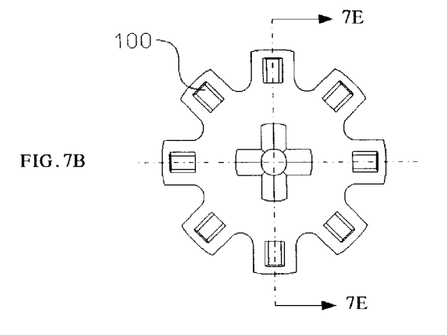
FIG. 7B of the drawings is a top plan view of the clutch plate of the rearward clutch member of the present invention.
Figure 7C:
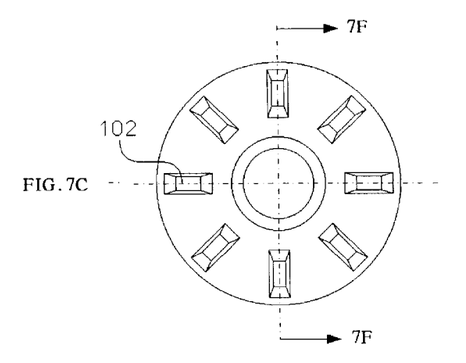
FIG. 7C of the drawings is a top plan view of the rear final drive gear having mating form of the present invention.
Figure 7D:
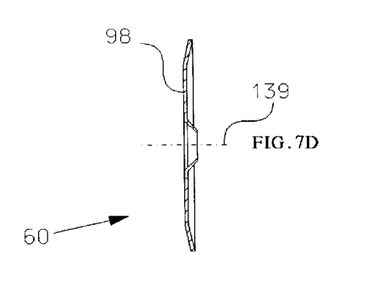
FIG. 7D of the drawings is a cross-sectional view of the spring plate of FIG. 7A taken generally about lines 7D—7D of FIG. 7A.
Figure 7E:
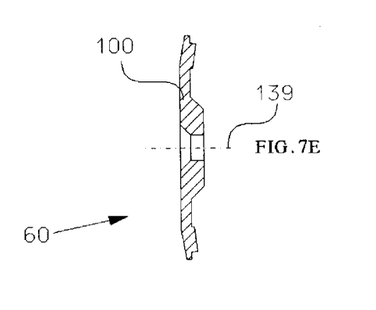
FIG. 7E of the drawings is a cross-sectional view of the clutch plate of FIG. 7B taken generally about lines 7E—7E of FIG. 7B.
Figure 7F:
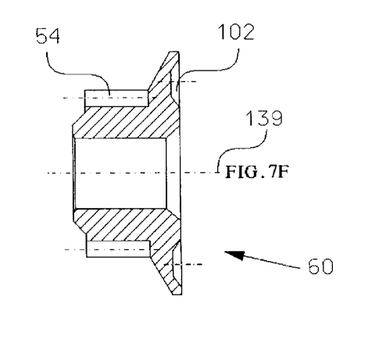
FIG. 7F of the drawings is a cross-sectional view of the rear drive gear shown in FIG. 7C taken generally about lines 7F—7F of FIG. 7C.

First single direction drive gear system 42, as shown in FIG. 3 includes smaller gear 84 and larger gear 86, and is rotatably associated with second axis of rotation 139. Smaller gear 84 includes peaks such as peak 118 and valleys such as valley 120. Larger gear 86 includes peaks such as peak 122 and valleys such as valley 124. As will be explained, first single direction drive gear engages input gear system 40, but transfers its movement to second axis of rotation 139 upon rotation in only one of a clockwise and counter-clockwise direction.

Second single direction drive gear system 44, as shown in FIGS. 1–2,4,5 and 8, includes smaller gear 88 and larger gear 90, and is rotatably associated third axis of rotation 141. Smaller gear 88 includes peaks such as peak 126 and valleys such as valley 128. Larger gear 90 includes peaks such as peak 130 and valleys such as valley 132. As will be explained, second single direction drive gear engages input gear system 40, but transfers its movement to third axis of rotation 141 upon rotation in only one of a clockwise and counter-clockwise direction, opposite the direction of the first single direction drive gear.

Of course, where the input gear system includes gears in excess of the two gears identified above, such as, for instance, with a racing wheel chair, first and second single direction gear systems will likewise include a matching number of gears, as will be understood by one with ordinary skill in the art.

As shown in FIG. 3, first rear drive gear 46 is rotatably fixed to second axis of rotation 139. Similarly second rear drive gear 48 is rotatably fixed to third axis of rotation. Additionally, first drive gear 46 engages second drive gear 48. As will be explained, these gears will be powered by only one of the single direction gear systems at any time.

Forward final drive gear 50 is shown in FIGS. 1,2,4 and 8 as being rotatably associated with third axis of rotation 141, and, engages forward hub gear 52 which is fixedly associated with hub region 62. Rearward final drive gear 54 is rotatably associated with third axis of rotation 141, and, engages rearward hub gear 56 which is associated with forward hub gear 52, and in turn hub region 62.

Seizure precluding means 26 is shown in FIGS. 1, 3, 6 and 7 as including forward clutch member 58 and rearward clutch member 60. Forward clutch member 58 is shown in FIG. 6 as comprising spring plate 92, clutch plate 94 and mating form 96. Mating form 96 is found on forward final drive gear 50. Clutch plate 94, which is rotatably fixed to second axis of rotation 139, engages mating form 96 and is retained by spring plate 92. As will be explained, upon inadvertent seizure of the linear conversion system in a forward gear, the clutch plate in combination with mating form 96 will overcome spring plate 92, to facilitate continued movement of final drive gear 50, and in turn hub 62. Further, the continuous interference of the clutch plate and the mating form through the spring bias will facilitate the gradual and controlled deceleration of the wheelchair.

Similarly rearward clutch member 60, as shown in FIGS. 3 and 7, includes spring plate 98, clutch plate 100 and mating form 102. Mating form 102 is positioned on the rear final drive gear. Clutch plate 100, which is rotatably fixed to third axis of rotation 141, engages mating form 102 and is retained by spring plate 98. As with forward clutch member, the clutch plate in combination with mating form 102 will overcome spring plate 98 to facilitate continued movement of the final rearward drive gear and, in turn, hub 62. Just as with forward clutch member, the interference of the clutch plate and the mating form through the biasing of the spring plate serves to slow down the wheelchair in a controlled manner.

In operation, the system is attached to, for example, a wheelchair or other wheeled device. The user is positioned on the seat of the wheelchair and grips the grip region of the handle member with his or her hand. While certainly not limited thereto, such a drive system will be incorporated on both sides of the wheelchair.

Once fully positioned, the user next engages the desired direction. In particular, the user adjusts second leg 32 of handle member 22 to manipulate rack 108 relative to pawl 106 by way of rotation of extension region about axis 185. At the same time, forward hub gear is slidably moved along first axis of rotation 140 to engage one of rear hub gear 56 (reverse) or forward final drive gear 50.

Next, the user manipulates the gear selector to engage either the lower gear "easier" or the higher gear "harder". Of course, as explained above, it is additionally contemplated that further gears in excess of the two gears identified above are also contemplated, especially with racing type wheelchairs. To engage the lower gear, lever 66 is rotated until it is flush against first leg 30. In this position, cable 68 slidably positions input gear about first axis of rotation 140 until smaller gear 80 engages larger gear 86 of first single direction drive gear system 42 and larger gear 90 of second single direction drive gear system 44.

Conversely, to engage the higher gear, lever 66 is rotated until it is flush against second leg 32. In this position, cable 68 slidably positions input gear system 40 about first axis of rotation 140 until larger gear 82 engages smaller gear 84 of first single direction drive gear system 42 and smaller gear 88 of second single direction drive gear system 44.

Once the desired direction and gearing has been selected and engaged the user begins to move the handle member forward and backward, thus continuously propelling the wheelchair in the desired forward direction. Specifically, where the higher gear is selected and the user desires to go forward, the following gear interactions are achieved to propel the wheelchair, with reference being made to FIGS. 1–5, 8 and 9, in particular.

As the user moves the handle member forward, larger gear 82 of input gear system 40 is caused to rotate in a clockwise direction. Larger gear 82 imparts rotation upon both smaller gear 86 of first single direction drive gear system 42 and smaller gear 90 of second single direction drive gear, both in a counter-clockwise direction. Inasmuch as the single direction drive gears free-wheel in a one direction of rotation and fixedly rotate with the respective axis of rotation in the other direction, during this forward power stroke, second single direction drive gear system 44 imparts rotational motion to axis of rotation 141, and in turn, second rear drive gear 48 in a counter-clockwise direction. First single direction drive gear system 42 freewheels around second axis of rotation 139.

Second rear drive gear 48 powers forward final drive gear 50 which shares a common axis of rotation with second rear drive gear 48. At such time, the forward final drive gear 50 engages and powers forward hub gear, which in turn rotates hub 62 and tire, thereby powering the wheelchair in the forward direction.

Second rear drive gear likewise powers first rear drive gear 46 which then powers rear final drive gear 54, which, in turn, powers rearward hub gear 56. Inasmuch as, through direction member 36, the forward gears have been selected, the rearward hub gear freewheels about first axis of rotation 139.

Once the forward stroke is completed, the handle member is rotated in the rearward direction. During this movement, larger gear 82 of input gear 40 is caused to rotate in a counterclockwise direction. Larger gear 83 imparts rotation upon both smaller gear 86 of first single direction drive gear system 42 and smaller gear 90 of second single direction drive gear, both in a clockwise direction. Unlike the case with forward motion of the handle member, when the handle member is moved rearwardly, the first single direction drive gear system 42 imparts rotational motion to axis of rotation 139, which in turn powers first rear drive gear in a clockwise direction. Second single direction drive gear freewheels around third axis of rotation 141.

The first rear drive gear, in turn, powers second rear drive gear 48 in a counter clockwise direction. Second rear drive gear 48 powers forward final drive gear 50. The final drive gear engages and powers forward hub gear 52, which in turn, rotates hub 62 and tire, in a clockwise direction, further propelling the wheelchair forward.

The first forward drive gear likewise powers the rear drive gears, which, as explained above, continue to freewheel about first axis of rotation 139.

The forward and rearward movement can be repeated to continuously power the wheelchair in a forward direction.

If the user now desires to shift from the high gear to the low gear, to for instance climb an incline or to make the wheelchair move with less force, a simple procedure is undertaken. The user, either when the chair is not moving, or when the chair is in full movement flips lever 66 so that it lies against first leg 30. This in turn, will force input gear 40 to slidably move relative to the first axis of rotation 140 so that smaller gear 80 of input gear system 40 engages larger gears 86 and 90 of first single direction drive gear system 42 and second single direction drive gear system 44, respectively.

Importantly, as explained above, and as shown in FIG. 5, both smaller input gear 80 and larger input gear 82 have a corresponding peak, namely peak 110 and 114 correspond. Further, both first and second single direction drive gears 42 and 44 include corresponding valleys. Specifically, valley 112 corresponds to valley 116 and valley 120 corresponds to valley 124. Due to this relationship, the gears can be synchronized on the fly. As a result, without the use of synchros, clutches, chains or other devices, the user is capable of changing from a lower gear to a higher gear without stopping, and during full movement. This is quite advantageous since the user has the ability to change gears when it is most useful, namely, during movement of the wheelchair. Moreover, this is even more critical with racing or sportsman type wheelchairs which may include several gears.

If the user desires to change direction, namely to change from forward to reverse, the user merely readjusts the handle member relative to the final drive gears, as explained above. Specifically the user outwardly pivots the extension region 45 of the second end relative to the mount region 43 so that forward hub gear 52 engages rear hub gear 56 and disengages forward final drive gear 50.

Ultimately, the change from forward to reverse should be made when the wheelchair is not in motion. However, should this change be effectuated when the wheelchair is moving in a forward direction, seizure precluding means 26 prevents the user from being catapulted from the wheelchair. Specifically, without such seizure preclusion means, the entire gear train would seize, locking the wheel, resulting in a alarming rate of deceleration. Ultimately, the user would be catapulted from the wheelchair, or, the wheelchair would enter into a forward rollover.

Seizure precluding means operates through forward and rearward clutch members (depending on whether the unit was inadvertently placed into forward or reverse). For instance, if the unit was inadvertently placed into reverse while the wheelchair is moving forward, the momentum and the force on the reverse gear would overcome spring plate 98 thereby permitting clutch plate 100 to rotate relative to mating form 102. Due to the uneven surfaces of the clutch plate and the mating form, and due to the constant action of the spring plate, as the wheel continues to rotate, these members will likewise serve to slow the wheelchair at a controlled rate which will stop the wheelchair, yet prevent any catapulting of the user or roll-over of the wheelchair. Additionally, the seizure precluding means can be used to slow down the wheelchair (in addition to the brakes). This is particularly useful where the wheelchair user has begun to lose control or where the surface is inclined or slippery.

To otherwise slow down or come to a complete stop, the user can utilize hand brake member 38. Brake member 38, through brake lever 72 separates shoes 78 to engage a the drum region of the hub 62, to effectively slow the rotation of the hub.

To change direction of the wheelchair of this embodiment, as explained above, it is most desirable to mount a drive system to each side of the wheelchair. Accordingly, the user can alter direction by changing the relative rotation of each side of the wheelchair. Specifically, to turn to the user's left, the user can either increase the speed of the right drive system relative to the left drive system, or, conversely decrease the speed of the left drive system relative to the right drive system. Further, the user can even turn in place by placing one drive system in forward and the other drive system in reverse.

Where the user is to be pushed by another individual, the construction of the gearing system permits the hub to rotate forward without further movement of the handle member. Likewise, the gearing system allows the hub to rotate rearward without the handle member when the reverse gears are engaged. Alternatively, the user may position the gearing in neutral, that is the forward hub gear 52 and rear hub gear do not engage the gear train. In this position, the user can be moved by another individual in any direction without the additional movement of the handle member.

The foregoing description and drawings merely explain and illustrate the invention and the invention is not limited thereto, except insofar as the appended claims, as those skilled in the art who have the disclosure before them will be able to make modifications and variations therein without departing from the scope of the invention.

What I claim is:

1. A drive system for use in association with a wheelchair, the drive system including:
   at least one input gear system positioned on a first axis of rotation, the at least one input gear system having at least two gears, each of the gears having teeth defining peaks and valleys, one of at least one peak of each of the at least two gears corresponding to each other or at least one valley of each of the at least two gears corresponding to each other;
   means for powering the at least one input gear system;
   at least one drive gear system positioned on a second axis of rotation and selectably engageable with the at least one input gear system, the at least one drive gear system having at least two gears, each of the gears having teeth defining peaks and valleys, the opposite, relative to the input gear system, of the at least one peak or at least one valley of the at least two gears of the at least one drive gear system corresponding to each other;
   a positioning member, the positioning member positioning the desired one of the at least two gears of the at least one drive gear with at least one of the two gears of the at least one input gear system through transversely slidable movement of at least one of the at least one drive gear system and the at least one input gear system along their respective axis of rotation, to, in turn, engage the desired gear of the at least one drive gear system to the desired gear of the at least one input gear system, and to, in turn, facilitate engagement and synchronization upon altering of the positioning member to engage an alternate drive gear and an input gear during rotation of same; and
   means for transferring movement of the drive gear system to a wheel.

2. The drive system according to claim 1 wherein the at least one input gear system comprises a single input gear system having two gears having a common axis of rotation, each of the gears having a different diameter.

3. The drive system according to claim 1 wherein the at least one drive gear system comprises a first single direction drive gear system and a second single direction drive gear system, each of the single direction drive gear systems including two gears, and rotating on distinct axis of rotation.

4. The drive system according to claim 1 wherein the powering means comprising a handle member rotatably associated with the at least one input gear system, the selective positioning means including a gear selector lever associated with the input gear system and the handle member.

5. The drive system according to claim 1 further including:
   means for braking the wheel;
   means for selecting the direction of rotation of the wheel;
   the braking means and the direction selecting means associated with the hand grip region of the handle member, to, in turn, facilitate control of thereof without releasing the user's hand from the grip region.

6. The drive system according to claim 5 wherein the braking means comprises:
   at least one brake shoe associated with the hub region of the wheel;
   a lever pivotally associated with the hand grip region;
   a cable member associated with the at least one brake shoe and the lever, wherein movement of the lever facilitates selective engagement of the brake shoe and the hub region of the wheel.

7. The drive system according to claim 5 wherein:
   the movement transferring means further includes at least one hub gear associated with the transfer gear system and slidably engageable with a forward final drive gear;
   the direction selection means comprises an engagement member associated with an extension region of the handle member, and pivotally associated with a mount region of the handle member, wherein pivoting of the engagement member relative to the mount member slidably positions the hub gear into desired engagement with either the forward or the rearward final drive gear.

8. The drive system according to claim 5 further including:
   means for retaining the desired selected direction of rotation of the wheel.

9. The drive system according to claim 8 wherein:
   the handle member further includes a mount region and an extension region, the extension region associated with the direction selecting means and one of pivotally or slidably associated with the mount region;
   the retaining means further comprises:
   at least one rack member associated with one of the mount region and the extension region; and
   at least one pawl member associated with the other of the mount region and the extension region, the at least one pawl member engaging the at least one rack member to retain the extension region, and, in turn, the direction selecting means in the appropriate desired position.

10. A wheelchair drive system for use in association with a wheelchair having a frame and at least two wheels comprising:
    a handle member rotatably associated with a hub region of the wheel, the handle member further including a hand grip region for accepting at least a portion of at least one of a user's hand and arm;
    a linear conversion system associated with the hub region of a wheel, the linear conversion system capable of continuously transferring clockwise and counterclockwise rotation of the handle member into rotation of the wheel in a selected direction of rotation;

means for selecting a desired direction of rotation of the wheel; and means for precluding seizure of the hub region of the wheel upon selection of an inappropriate direction of rotation of the wheel.

11. The drive system according to claim 10 wherein the seizure precluding means further includes means for controllably stopping the rotation of the wheel.

12. The drive system according to claim 10 wherein the linear conversion system includes at least one input gear on a first axis of rotation and at least one forward drive gear associated with a second axis of rotation and the wheel hub and rearward drive gear associated with a third axis of rotation and the wheel hub, the seizure precluding means includes:

a first clutch biased against the forward drive gear, and rotatably associated with the third axis of rotation;

a second clutch biased against the rearward drive gear and rotatably associated with the second axis of rotation;

the first and second clutches capable of independently disengaging from the forward drive gear and the rearward drive gear, respectively, upon selection of an inappropriate direction of rotation of the wheel.

13. A handle member for use in association with a drive system of a wheelchair, wherein the drive system of the wheelchair includes a linear conversion system located within the hub of a wheel having a outer rim circumference, the wheel mounted proximate the axis of the back of the wheelchair, the handle member comprising:

a first leg extending from the drive system outwardly toward the wheel circumference; and a second leg extending from the first leg, at least a portion of the second leg extending beyond the outer rim circumference of the wheel, the second leg being angled in the direction of rotation of the handle member relative to the first leg at an angle between 90° and 150°.

14. The handle member according to claim 13 wherein the outer rim circumference of the wheel is between 20 inches and 26 inches.

15. The handle member according to claim 13 wherein the angle between the first and second leg is between 90° and 110°.

16. The drive system comprising:

an input gear;

a first single direction drive gear associatable with the at least one input gear;

a second single direction drive gear associatable with the at least one input gear;

the input gear, the first single direction drive gear and the second single direction drive gear all having separate and distinct axis of rotation;

at least one forward gear associated with the first and second single direction drive gears associated with a wheel to provide rotation in a first direction;

at least one rearward gear associated with the first and second single direction drive gears associated with a wheel to provide rotation in a second direction;

means for selecting the direction of rotation of the wheel, by way of association of one of the at least one forward gear and the at least one rearward gear; and means for retaining the desired selected direction of rotation of the wheel, wherein the retaining means includes:

at least one rack member associated with one of a mount region and an extension region of a handle member; and at least one pawl member associated with the other of the mount region and the extension region, the at least one pawl member engaging the at least one rack member to retain the extension region, and, in turn, the direction selecting means in the appropriate desired position.

* * * * *